(12) United States Patent
Pitchaikani et al.

(10) Patent No.: US 9,330,400 B2
(45) Date of Patent: May 3, 2016

(54) SYSTEMS AND METHODS FOR INJECTING CONTENT

(71) Applicant: NOMADIX, INC., Agoura Hills, CA (US)

(72) Inventors: Balaji Pitchaikani, Los Altos, CA (US); Eric Christopher Brusseau, Thousand Oaks, CA (US); Vadim Olshansky, Tarzana, CA (US); Peter Matthew Feldman, Austin, TX (US); Charles S. Zumbahlen, Denver, CO (US); Elyas Manzur Salem, Sunnyvale, CA (US)

(73) Assignee: NOMADIX, INC., Agoura Hills, CA (US)

( * ) Notice: Subject to any disclaimer, the term of this patent is extended or adjusted under 35 U.S.C. 154(b) by 8 days.

(21) Appl. No.: 14/517,066

(22) Filed: Oct. 17, 2014

(65) Prior Publication Data

US 2015/0206186 A1    Jul. 23, 2015

Related U.S. Application Data

(63) Continuation of application No. 11/864,319, filed on Sep. 28, 2007, now Pat. No. 8,868,740.

(60) Provisional application No. 60/848,116, filed on Sep. 29, 2006.

(51) Int. Cl.
*G06F 15/173* (2006.01)
*G06Q 30/02* (2012.01)
(Continued)

(52) U.S. Cl.
CPC .......... *G06Q 30/0261* (2013.01); *H04L 61/609* (2013.01); *H04L 67/20* (2013.01); *H04L 67/22* (2013.01)

(58) Field of Classification Search
CPC ........................... H04M 1/72572; H04W 4/02
See application file for complete search history.

(56) References Cited

U.S. PATENT DOCUMENTS 5,185,860 A    2/1993  Wu
5,293,488 A    3/1994  Riley
(Continued)

FOREIGN PATENT DOCUMENTS

AU    2007303531    4/2008
CN       1251669    4/2000
(Continued)

OTHER PUBLICATIONS

Complaint filed Jan. 19, 2010 in Case No. CV 10-0381 (C.D. Cal. 2010), Nomadix, Inc. v. Solution Inc. Technologies Ltd.
(Continued)

*Primary Examiner* — Philip Chea
*Assistant Examiner* — Mohammed Ahmed
(74) *Attorney, Agent, or Firm* — Knobbe Martens Olson & Bear, LLP

(57) ABSTRACT

Aspects of the present disclosure include systems and methods for injecting content into a webpage at or local to a network access gateway. For example, in an embodiment, a network access gateway is provided for accessing the internet. A user logs onto the internet through the network access gateway and request a webpage. The gateway requests the webpage from the webpage provider. Before the gateway delivers the webpage to the user, the gateway, or a content injection engine local to the gateway, injects content, such as, for example, advertisements or other useful information, into the webpage and then sends the altered webpage to the user.

16 Claims, 20 Drawing Sheets

(51) Int. Cl.
*H04L 29/08* (2006.01)
*H04L 29/12* (2006.01)

(56) References Cited

U.S. PATENT DOCUMENTS

| | | | |
|---|---|---|---|
| 5,678,041 A | 10/1997 | Baker | |
| 5,699,520 A | 12/1997 | Hodgson | |
| 5,786,952 A | 7/1998 | Umemoto et al. | |
| 5,796,952 A | 8/1998 | Davis et al. | |
| 5,835,061 A | 11/1998 | Stewart | |
| 5,940,394 A | 8/1999 | Killian | |
| 5,969,678 A | 10/1999 | Stewart | |
| 6,064,674 A | 5/2000 | Doidge et al. | |
| 6,115,545 A | 9/2000 | Mellquist | |
| 6,141,690 A | 10/2000 | Weiman | |
| 6,173,322 B1 | 1/2001 | Hu | |
| 6,240,533 B1 | 5/2001 | Slemmer | |
| 6,256,307 B1 | 7/2001 | Salmonson | |
| 6,259,405 B1 | 7/2001 | Stewart | |
| 6,326,918 B1 | 12/2001 | Stewart | |
| 6,414,635 B1 | 7/2002 | Stewart et al. | |
| 6,452,498 B2 | 9/2002 | Stewart | |
| 6,453,353 B1 | 9/2002 | Win | |
| 6,470,027 B1 | 10/2002 | Birrell | |
| 6,470,386 B1 | 10/2002 | Combar | |
| 6,564,243 B1* | 5/2003 | Yedidia | H04L 29/06 704/217 |
| 6,571,221 B1 | 5/2003 | Stewart | |
| 6,574,664 B1 | 6/2003 | Liu | |
| 6,584,505 B1 | 6/2003 | Howard | |
| 6,697,018 B2 | 2/2004 | Stewart | |
| 6,732,176 B1 | 5/2004 | Stewart | |
| 6,738,382 B1 | 5/2004 | West | |
| 6,751,677 B1 | 6/2004 | Ilnicki | |
| 6,759,960 B2 | 7/2004 | Stewart | |
| 6,760,416 B1 | 7/2004 | Banks et al. | |
| 6,823,059 B2 | 11/2004 | Kalmanek | |
| 6,834,341 B1 | 12/2004 | Bahl | |
| 6,856,800 B1 | 2/2005 | Henry et al. | |
| 6,934,754 B2 | 8/2005 | West et al. | |
| 6,970,927 B1 | 11/2005 | Stewart | |
| 6,981,265 B1* | 12/2005 | Rees | G06F 9/548 719/313 |
| 6,996,073 B2 | 2/2006 | West | |
| 7,003,578 B2 | 2/2006 | Kanada et al. | |
| 7,007,080 B2 | 2/2006 | Wilson | |
| 7,009,556 B2 | 3/2006 | Stewart | |
| 7,016,960 B2 | 3/2006 | Howard | |
| 7,032,243 B2 | 4/2006 | Leerssen et al. | |
| 7,058,594 B2 | 6/2006 | Stewart | |
| 7,072,056 B1 | 7/2006 | Greaves et al. | |
| 7,120,678 B2 | 10/2006 | Greuel | |
| 7,126,915 B1 | 10/2006 | Lu | |
| 7,240,106 B2 | 7/2007 | Cochran et al. | |
| 7,269,653 B2 | 9/2007 | Mentze et al. | |
| 7,277,927 B2 | 10/2007 | Rensin et al. | |
| 7,349,982 B2 | 3/2008 | Hannum et al. | |
| 7,356,841 B2 | 4/2008 | Wilson et al. | |
| 7,376,113 B2 | 5/2008 | Taylor et al. | |
| 7,428,413 B2 | 9/2008 | Fink | |
| 7,472,191 B2 | 12/2008 | Stewart | |
| 7,474,617 B2 | 1/2009 | Molen et al. | |
| 7,526,538 B2 | 4/2009 | Wilson | |
| 7,580,376 B2 | 8/2009 | West | |
| 8,868,740 B2 | 10/2014 | Pitchaikani et al. | |
| 2001/0029465 A1* | 10/2001 | Strisower | G06F 3/0481 705/14.49 |
| 2001/0044818 A1 | 11/2001 | Liang | |
| 2002/0007393 A1* | 1/2002 | Hamel | G06F 17/30902 709/203 |
| 2002/0016736 A1* | 2/2002 | Cannon | G06Q 30/02 705/14.4 |
| 2002/0040395 A1* | 4/2002 | Davis | G06F 11/3438 709/224 |
| 2002/0082914 A1* | 6/2002 | Beyda | G06Q 30/00 705/14.55 |
| 2002/0156641 A1* | 10/2002 | Kitajima | G06Q 10/02 705/1.1 |
| 2002/0165926 A1* | 11/2002 | Rensin | G06F 17/30899 709/213 |
| 2002/0165986 A1* | 11/2002 | Tarnoff | G06F 17/30864 709/246 |
| 2002/0169865 A1 | 11/2002 | Tarnoff | |
| 2003/0083889 A1* | 5/2003 | Macklin | G06Q 10/02 705/5 |
| 2003/0171111 A1* | 9/2003 | Clark | H04L 69/329 455/414.1 |
| 2003/0187740 A1* | 10/2003 | Tanahashi | G06Q 30/02 705/14.5 |
| 2003/0234819 A1* | 12/2003 | Daly | G06F 17/30029 715/810 |
| 2004/0068579 A1* | 4/2004 | Marmigere | H04L 29/06 709/242 |
| 2005/0050462 A1* | 3/2005 | Whittle | G06F 3/0481 715/247 |
| 2005/0102178 A1* | 5/2005 | Phillips | G06Q 30/02 705/14.33 |
| 2005/0108033 A1* | 5/2005 | Everett-Church | G06F 9/542 719/328 |
| 2005/0120120 A1* | 6/2005 | Suzuki | G06F 3/1203 709/229 |
| 2005/0125453 A1* | 6/2005 | Rozack | H04L 29/06027 |
| 2006/0031404 A1* | 2/2006 | Kassab | G06F 17/30893 709/218 |
| 2006/0031436 A1* | 2/2006 | Sakata | H04L 12/14 709/221 |
| 2006/0089160 A1* | 4/2006 | Othmer | 455/457 |
| 2006/0095916 A1* | 5/2006 | Nishida | G06F 9/485 718/100 |
| 2006/0179042 A1* | 8/2006 | Bram | G06N 5/043 |
| 2006/0179058 A1* | 8/2006 | Bram | G06F 21/121 |
| 2006/0236257 A1* | 10/2006 | Othmer | G06Q 30/0243 715/774 |
| 2007/0038727 A1* | 2/2007 | Bailey | G06Q 10/02 709/219 |
| 2007/0043860 A1* | 2/2007 | Pabari | G06F 9/5072 709/224 |
| 2007/0136295 A1* | 6/2007 | Gorodyansky | G06F 17/30867 |
| 2007/0162598 A1* | 7/2007 | Gorodyansky | G06Q 30/02 709/224 |
| 2007/0192468 A1* | 8/2007 | Keeler | G06Q 30/0241 709/223 |
| 2008/0148383 A1* | 6/2008 | Pitchaikani | H04L 67/20 726/12 |
| 2008/0275966 A1 | 11/2008 | MacKinnon | |
| 2009/0077243 A1* | 3/2009 | Garg | H04L 67/143 709/228 |
| 2009/0172091 A1 | 7/2009 | Hamel | |
| 2009/0323624 A1* | 12/2009 | Kim | H04W 48/20 370/329 |

FOREIGN PATENT DOCUMENTS

| | | |
|---|---|---|
| CN | 101536462 | 9/2009 |
| CN | 103595803 | 2/2014 |
| JP | 09-008917 | 1/1997 |
| JP | 10-105516 | 4/1998 |
| JP | 11-282804 | 10/1999 |
| JP | 2002-163188 | 6/2002 |
| JP | 2002-189665 | 7/2002 |
| JP | 2002-232952 | 8/2002 |
| JP | 2002-535689 | 10/2002 |
| JP | 2002-328866 | 11/2002 |
| JP | 2004-503884 | 2/2004 |
| JP | 2004-252494 | 9/2004 |
| JP | 2005-184228 | 7/2005 |
| JP | 2005-189827 | 7/2005 |
| JP | 2007-524903 | 8/2007 |
| JP | 2010-050626 | 2/2010 |
| JP | 2013-232204 | 11/2013 |
| KR | 2009-0094229 | 9/2009 |
| WO | WO 00/016529 | 3/2000 |
| WO | WO 00/030002 | 5/2000 |

(56) References Cited

FOREIGN PATENT DOCUMENTS

| WO | WO 00/079406 | 12/2000 |
|----|--------------|---------|
| WO | WO 01/031883 | 5/2001 |
| WO | WO 01/063835 | 8/2001 |
| WO | WO 01/097156 | 12/2001 |
| WO | WO 2005/003990 | 1/2005 |
| WO | WO 2005/117548 | 12/2005 |
| WO | WO 2008/042804 | 4/2008 |

OTHER PUBLICATIONS

Complaint filed Nov. 17, 2009 in Case No. CV 09-8441 (C.D. Cal. 2009), Nomadix, Inc. v. Hewlett-Packard Co.
International Search Report and Written Opinion in PCT Application No. PCT/US2007/079974, dated Aug. 21, 2008 in 15 pages.
Invitation to Pay Additional Fees in PCT Application No. PCT/US2007/079974, dated Jun. 13, 2008 in 5 pages.
Maruyama et al, "A Secure LAN Sockets System for Everyone Which Need Not Modify Existing Dhcp Clients", Study Report of Information Processing Society of Japan, Jul. 16, 1999, vol. 99, No. 56, pp. 131-136.
Official Communication in Australian Application No. 2007303531, dated Aug. 24, 2010 in 4 pages.
Official Communication in Australian Application No. 2011202527, dated Feb. 2, 2012 in 2 pages.
Official Communication in Chinese Application No. 200780041876.9, dated Dec. 31, 2011 in 6 pages.
Official Communication in Chinese Application No. 200780041876.9, dated Oct. 9, 2012 in 4 pages.
Official Communication in European Application No. 07843538.5, dated Dec. 20, 2010 in 7 pages.
Official Communication in Japanese Application No. 2009-530653, dated Dec. 18, 2012 in 3 pages.
Official Communication in Japanese Application No. 2009-530653, dated Jun. 5, 2012 in 4 pages.
Official Communication in Japanese Application No. 2013-120725, dated Jul. 1, 2014 in 4 pages.
Publication of Indian Application No. 2354/DELNP/2009, filed Apr. 9, 2009.
Written Opinion in Singapore Application No. 200902128-8, dated Feb. 21, 2015 in 13 pages.
Official Communication in Chinese Application No. 200780041876.9, dated Apr. 15, 2013 in 5 pages.
Official Communication in Japanese Application No. 2013-120725, dated Jan. 6, 2015 in 5 pages.
Exam Report in Singapore Application No. 200902128-8, dated Oct. 15, 2012 in 4 pages.
International Preliminary Report on Patentability and Written Opinion in PCT Application No. PCT/US2007/079974, dated Apr. 9, 2009 in 9 pages.

\* cited by examiner

SYSTEMS AND METHODS FOR INJECTING CONTENT

REFERENCE TO RELATED APPLICATIONS

This application is a continuation of U.S. patent application Ser. No. 11/864,319, filed Sep. 28, 2007, entitled "SYSTEMS AND METHODS FOR INJECTING CONTENT," which claims priority benefit under 35 U.S.C. §119(e) from U.S. Provisional Application No. 60/848,116, filed Sep. 29, 2006, entitled "SYSTEMS AND METHODS FOR INJECTING CONTENT," which are incorporated herein by reference.

FIELD OF THE INVENTION

The present invention relates to the field of providing network access. More particularly, the present invention relates to providing content to a user accessing a network.

BACKGROUND

The internet is a vast array of interconnected computers which share information with each other. The internet has become an important arena for sharing, storing, transferring, searching for information, and transacting business. Increasingly, the general public is able to access the internet in a wider range of locations. For example, public access to the internet is becoming increasingly popular in locations such as hotel rooms, airports, and coffee shops. However, local network access providers have little control over the content requested and viewed by a user.

SUMMARY

Aspects of the present disclosure include systems and methods for injecting content into a webpage at or local to a network access gateway as well as remote to the gateway. For example, in an embodiment, a network access gateway is provided for accessing the internet. A user logs onto the internet through the network access gateway and requests a webpage. The gateway requests the webpage from the webpage provider. Before the gateway delivers the webpage to the user, the gateway, or a content injection engine local or remote to the gateway, injects content, such as, for example, advertisements or other useful information, into the webpage and then sends the altered webpage to the user. In some embodiments, the content injected replaces some or all of the content provided by the webpage provider. In some embodiments, the content injected adds to the content provided by the webpage provider. When the user views the webpage, the user views the access provider's content rather than or in addition to the webpage provider's content.

In an embodiment, the injected content includes advertising related to or associated with the local network access provider. In an embodiment, the injected content includes user inputs for allowing a user to communicate and transact with the local network access provider or others associated with the local network access provider.

In an embodiment, advertising content is injected. In an embodiment, the advertising content is provided from a local advertising content system. In an embodiment, the advertising content is provided from a remote advertising content system. In an embodiment, the advertising content is provided by both a local and remote advertising content system. Local herein refers to a system which is not accessed through a network, but which is locally connected. Remote herein refers to a system which is accessed through a network independent of the system's location.

In an embodiment, content is provided based on a user's history of use. In an embodiment, content is provided based on a user's specified preferences. In an embodiment, content is provided based on user provided information, such as, for example, length of visit, requested services, demographic information, or the like. In an embodiment, content is provided based on the type of device used to connect to the network. For example, content provided to a user accessing a network through a personal digital assistant (PDA) can be different than content provided to a user accessing a network through a laptop or cell phone.

In an embodiment, a management system provides content to a content injection engine. The management system provides content that allows a user to select services and service preferences of a particular venue, such as, for example, a hotel, restaurant, convention center, airport, business, or the like. In an embodiment, multiple separate systems provide content to a user, such as, for example, a restaurant management service, a housekeeping management service, a front desk management service, or the like.

In an embodiment, a subscriber management system allows a user to save preferences so that each time the user visits a particular location they do not have to reenter their preferences. In an embodiment, the subscriber management system is local to a particular location. In an embodiment, the subscriber management system is remote to a particular location. In an embodiment, the subscriber management system is used to provide user preferences to multiple locations. For example, In an embodiment, the subscriber management system provides user preferences to individual hotels in a particular chain of hotels. In an embodiment, user preferences are shared between multiple hotel chains. In an embodiment, user information is shared throughout a range of network access provider locations servicing various industries.

In an embodiment, a local or remote system, such as an advertising provider system, management system, subscriber management system, the same or the like provides a different look and feel for the injected content based on the user and/or the location. For example, content injected into webpages provided to a user at one hotel chain may look different than content provided to a user at a different hotel chain. Similarly, content provided to a particular user specifying a particular set of preferences may be different than content provided to a different user specifying different preferences.

In an embodiment, the network gateway device injects the content. In an embodiment, the network gateway works in cooperation with a separate content injection engine to inject content. In an embodiment, the network injection engine injects content before it is received by the gateway device. In an embodiment, the network injection engine injects content after it is received by the gateway device. In an embodiment, the network injection engine is local to the gateway device. In an embodiment, the injection engine is remote to the gateway device. In an embodiment, an injection engine injects content for a plurality of gateway devices.

In an embodiment, the injected content is persistent. For example, in an embodiment, the content injection engine checks the user's device to confirm that the content is still visible on the user's screen. As another example, in an embodiment, the content is maintained on top of other applications on the user's screen so as to be continually visible. In an embodiment, the content is injected independent of the website or network content requested.

In an embodiment, a system for injecting content is disclosed. The system includes a network access gateway and a content injection engine. The content injection engine injects content into the requested network content. In an embodiment, the network access gateway and the content injection engine are included within the same housing. In an embodiment, the network access gateway and the content injection engine are included within separate housings.

In an embodiment, a method of injecting content local to a gateway device is disclosed. The method includes the steps of requesting network content at a gateway device; receiving network content at a content injection engine; injecting content into the network content at the content injection engine; and sending the injected network content to a user device. In an embodiment, the method also includes the step of parsing the received network content at the content injection engine before injecting the content. In an embodiment, the method also includes the step of confirming the injected content is found on the user's device. In an embodiment, the method includes the step of utilizing one or more of an applet, application, or compiled code to confirm the injected content is found and/or visible on the user's device. In an embodiment, applets, applications, or compiled code uses one or more of flash, java, JavaScript, VBscript, and HTML, or the like. Of course, it is to be understood that a person of ordinary skill in the art can use any programming language to accomplish the same tasks as those described in the present disclosure.

DETAILED DESCRIPTION

Figure 1A:
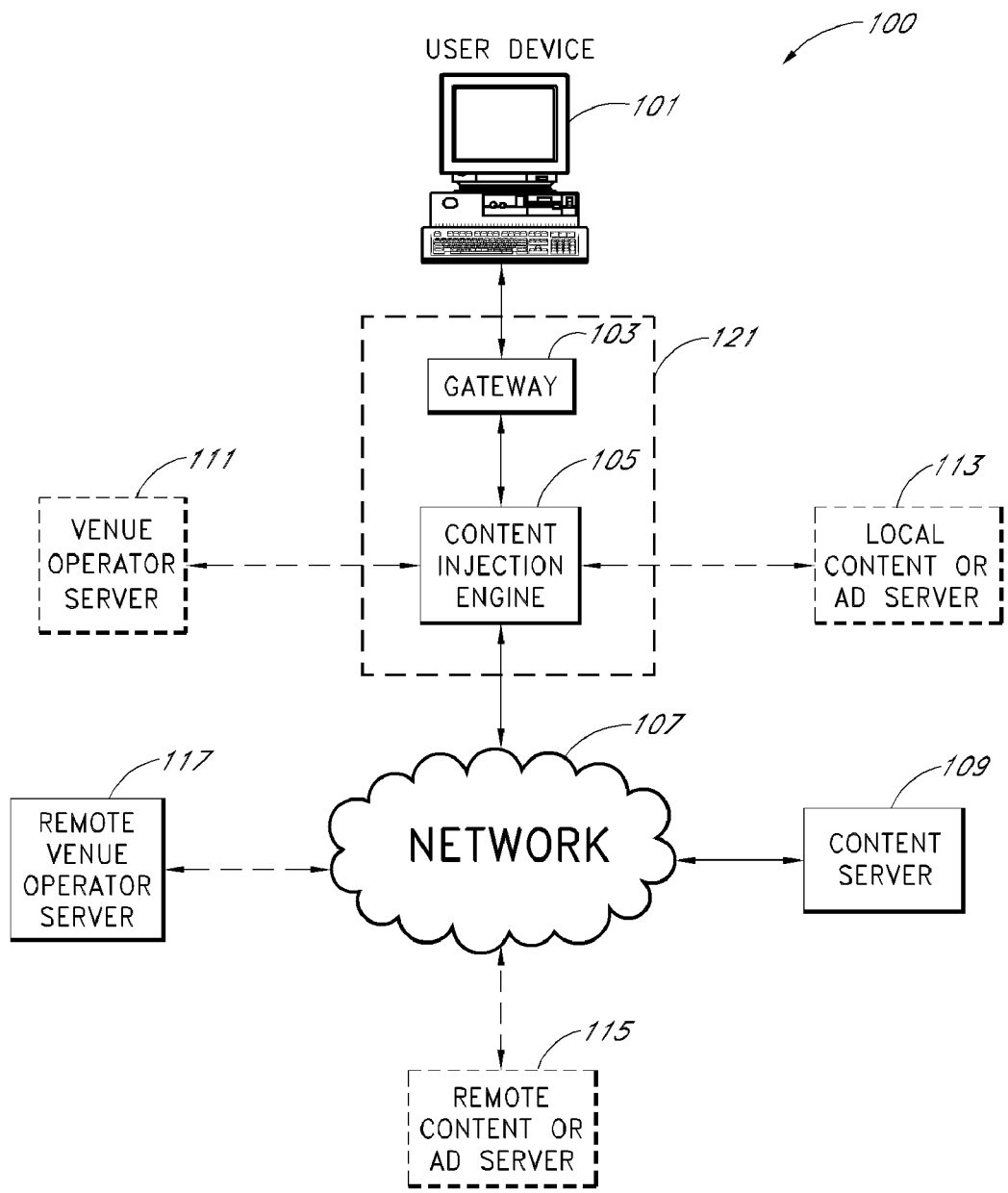
FIGS. 1A-1D illustrate embodiments of content injection systems.

FIG. 1A illustrates an embodiment of a content injection system 100. A user uses a client device 101, such as, for example, a computer, laptop, personal digital assistant (PDA), cell phone or the like, to connect to a gateway device 103. The connection can be wired or wireless and can be used with any available wired or wireless communications protocols such as, for example, Ethernet, Bluetooth, IEEE 802.11a-n, or the like. Once connected to the gateway device 103, the user can request information through a network 107, such as for example, the internet. The gateway device 103 communicates the user's requests to the content injection engine 105. The content injection engine 105 communicates with the requested content server 109 through the network 107. The requested content server 109 responds by transmitting the requested content to the content injection engine 105 through the network 107. The content injection engine 105 injects content into the requested content and transmits the altered requested content to the gateway device 103. The gateway device 103 transmits the altered requested content to the user device 101 which displays the altered requested content to the user. Some examples of a gateway device are explained in U.S. Pat. Nos. 6,636,894 and 6,130,892, the disclosures of which are hereby incorporated by reference.

In an embodiment, the content injection engine 105 injects content stored in the content injection engine 105. In an embodiment, the content injection engine 105 injects content supplied by a venue operator server 111. In an embodiment, the content injection engine 105 injects content supplied by a local ad or content server 113. In an embodiment, the content injection engine 105 injects content supplied by a remote content or ad server 115. In an embodiment, the content injection engine 105 injects content supplied from multiple sources including a venue operator server 111, a local content or ad server 113, and a remote content or ad server 115.

The local and/or remote ad or content provider servers 113, 115 provide local or remote content and advertising. For example, the local ad or content server 113 may provide advertising on local restaurants, local events, local activities, or the like. The local ad or content provider can also be used to provide non-locally related advertising. The remote ad or content server 115 provides advertising and content to multiple network access locations. The remote ad or content server 115 can provide local or non-local advertising.

The local or remote venue operator server 111, 117 provides injectable content from the venue operator. For example, the venue operator servers 111, 117 may inject advertisements specific to the venue. In an embodiment, the advertisements can be about the venue or can be targeted at venue users.

In an embodiment the content injection engine 105 and the gateway device 103 are housed within the same housing 121 or integrated into a single device. The content injection engine 105 can operate independent of the gateway device 103 within the same housing, or the content injection engine 105 may be an integral part of the gateway device 103.

Figure 1B:
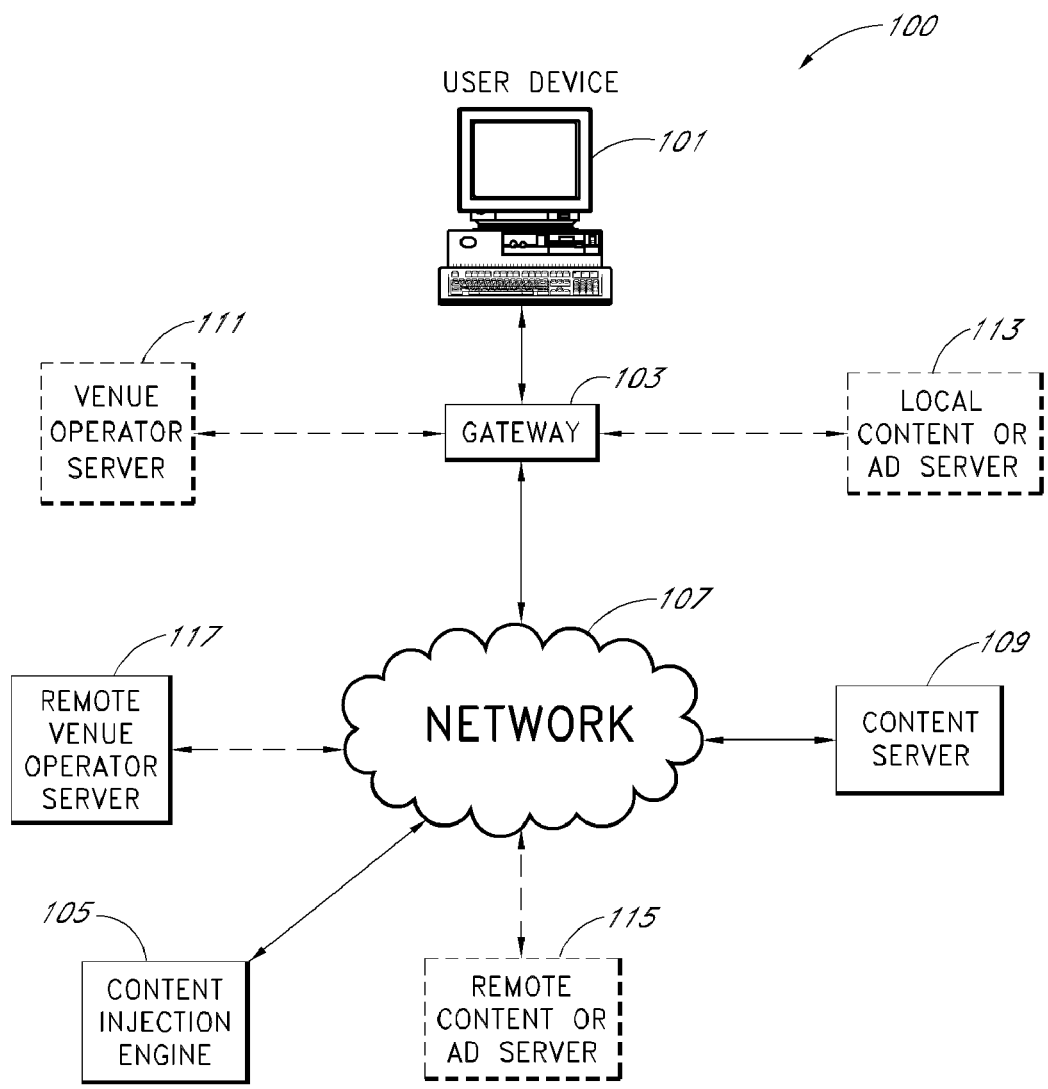

FIG. 1B illustrates an embodiment in which the content injections engine 105 is accessed through the network 107. For example, in an embodiment, when a user requests content, such as a webpage, the gateway device 103 forwards the request over the network 107 to the content injection engine 105 which then requests the content from the content provider. The content provider sends the requested content to the content injection engine 105 which injects content into the requested content. The content injection engine 105 then forwards the altered content to the gateway device 103, which forwards the altered content to the user.

Figure 1C:
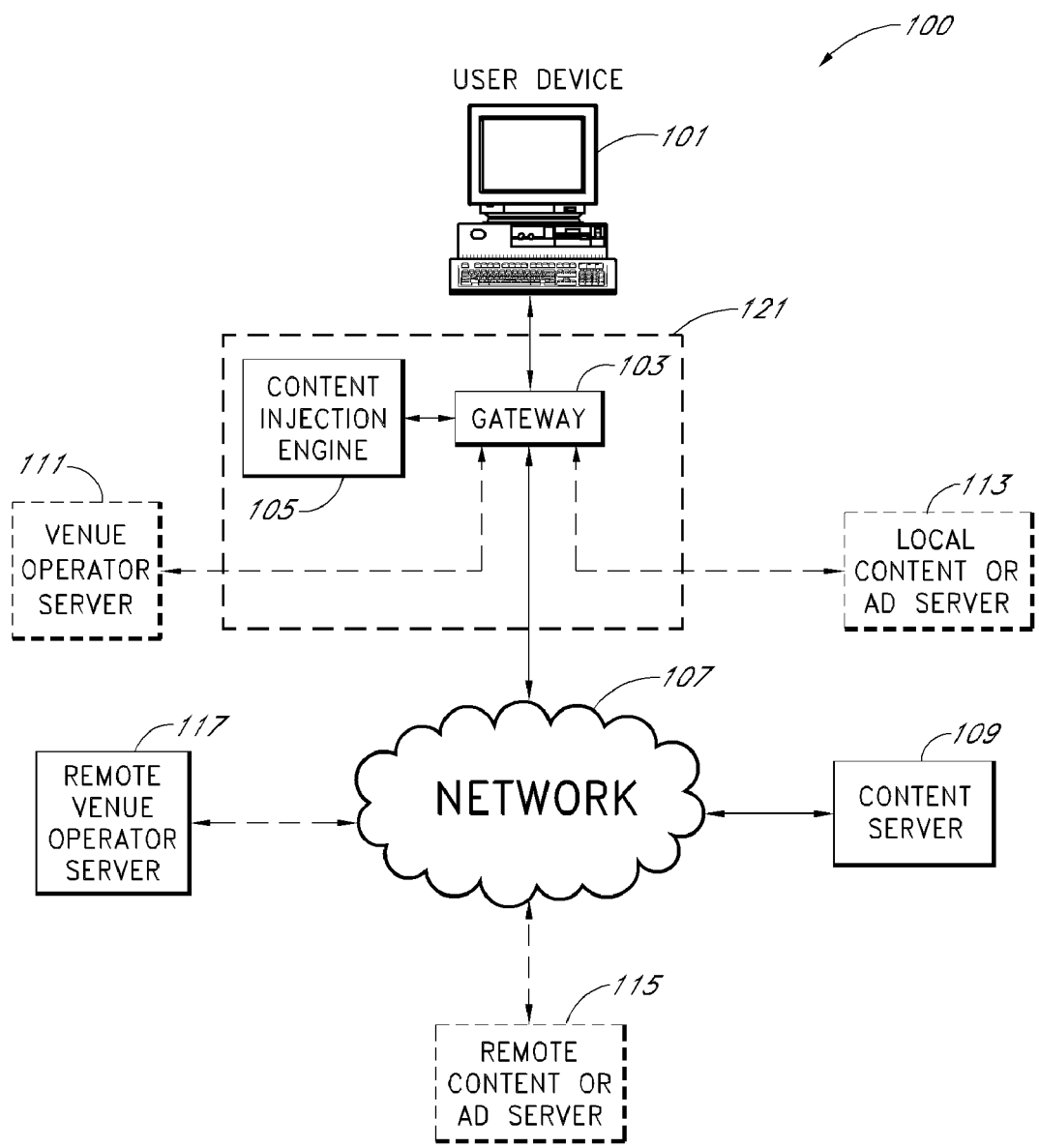

FIG. 1C illustrates an embodiment of a gateway device 103 which receives requested content directly from the network 107 and then forwards the received content to the content injection engine 105. The content injection engine 105 injects content and then forwards the requested content with the injected content to the gateway device 103 for delivery to the user. The content to be injected can be received by or stored in the gateway device 103 or content injection engine 105. The content to be injected can be received from various servers, such as, for example, the servers described above with respect to FIG. 1A. When it is received by the gateway device 103, the gateway device forwards the content to be injected to the content injection engine 105.

Figure 1D:
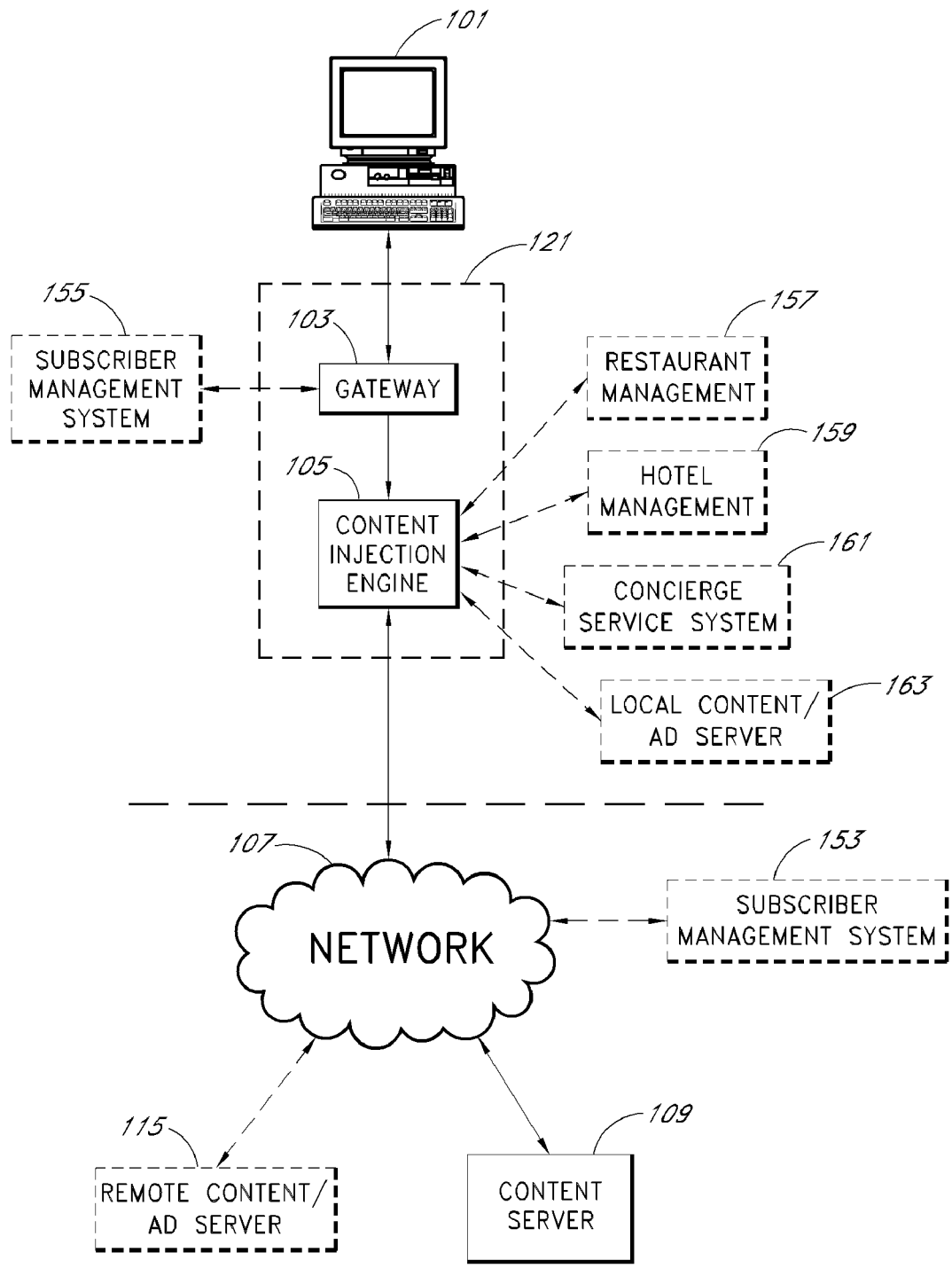

FIG. 1D illustrates another embodiment of a content injection system. FIG. 1D illustrates various local management systems in communication with the content injection engine 105 which are used to inject content regarding local services and information. The local management systems can include, such as, for example, a restaurant management system 157, a hotel management system 159, a concierge service system 161, a local content/ad server 163, or any other local service systems. For example, in an embodiment, the content injection engine 105 injects local restaurant information to allow a user to access information regarding local restaurants. In an embodiment, the injected content allows a user to make a reservation or order a delivered meal. In an embodiment, a concierge service system 161 provides content based on local activities, local events, traffic, weather, local restaurants, directions, or the like. In an embodiment, a hotel management system 159 allows a user to check in or checkout, provide preferences regarding hotel services, request a wake up call, or request information or services. Although FIG. 1D is described with respect to hotel services, a person of ordinary skill in the art will understand from the disclosure herein that other venues, such as airports, convention centers, schools, or the like, will provide similar content provider systems to provide a user with local content and local transaction options.

FIG. 1D also illustrates the use of a local subscriber management system 155 and/or a remote subscriber management system 153. In an embodiment of a subscriber management system, a user is allowed to save preferences so that each time the user visits a particular location they do not have to reenter their preferences. The local subscriber management system 155 saves user preferences specific to the particular access location. The remote subscriber management system 153 saves user preferences which are distributed to multiple access locations. For example, in an embodiment, the subscriber management system provides user preferences to individual hotels in a particular chain of hotels. In an embodiment, user preferences are shared between multiple hotels. In an embodiment, user information is shared throughout a network of network access provider locations servicing various industries.

Figure 2A:
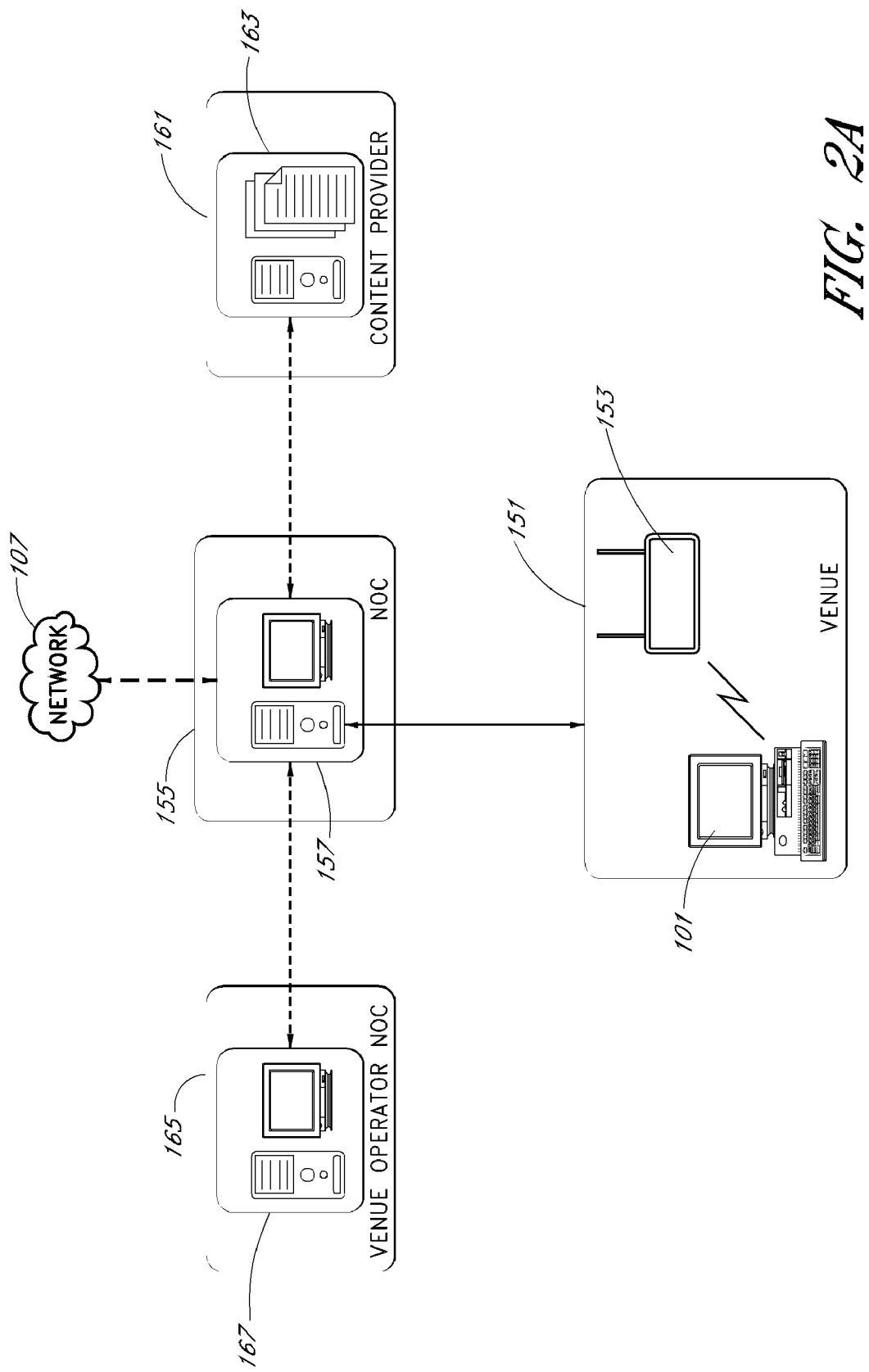
FIGS. 2A-2C illustrate embodiments of network operations centers used in conjunction with a content injection system.

FIG. 2A illustrates an embodiment of a content injection system utilizing a network operations center (NOC) 155. The network operations center can be used to manage multiple gateway devices and multiple venues. The network operation center can be located remote or local to a gateway device. The network operation center can also be physically mapped to multiple locations for data redundancy and reliability. The network operations center can provide a variety of services including, such as, for example, redirection, authentication, billing, content injection, management services or the like.

Figure 2B:
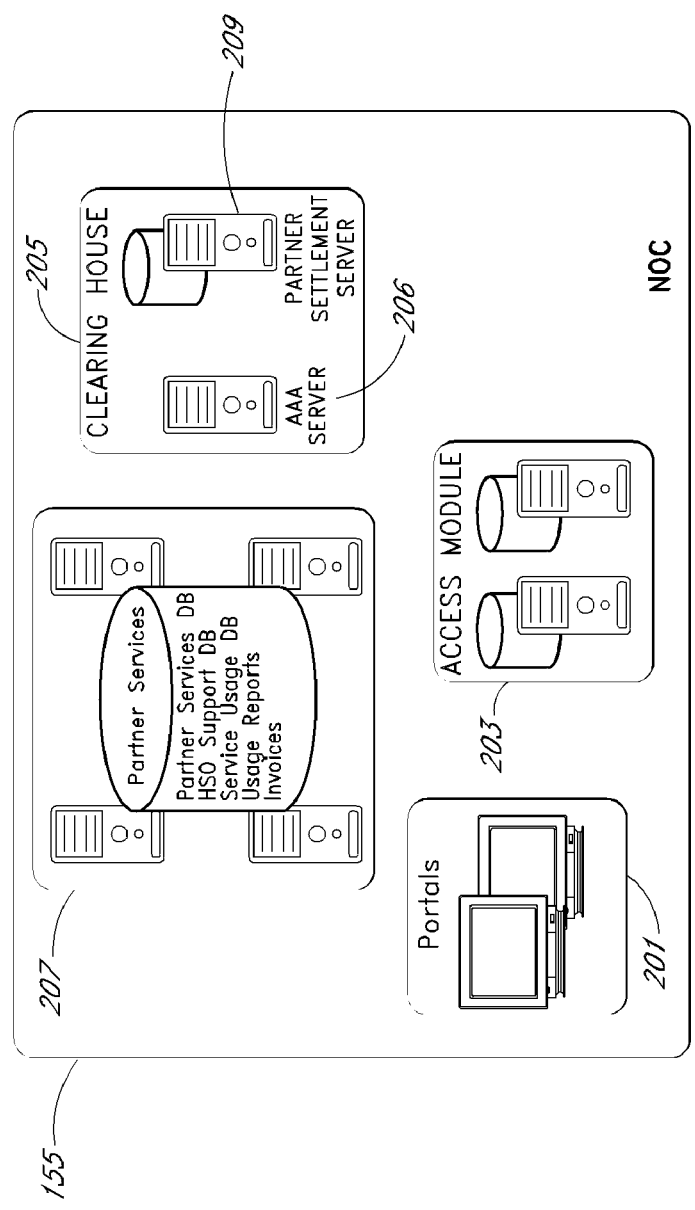

FIG. 2B illustrates an embodiment of a network operations center 155. The network operations center 155 includes portals 201, access module 203, partner services 207, and clearing house 205. Access module 203 provides services which allow the network access system to redirect and change the content viewed by a user's computer without the user having to reconfigure the user's device settings. The access module 203 makes it appear to the user's device that it is receiving the requested content when in fact the content may be different from that requested. Access module 203 can also provide content injection services to inject content into requested content.

Partner services 207 provides databases which track usage and expenses incurred by users and partners and provides usage reports, invoices and other services, such as, for example, technical support to partners. A partner can be, for example, a gateway or venue owner or operator. A venue can include one or more gateway devices providing network access from one or more locations in the venue or throughout the entire venue. A venue can be a coffee shop, airport, convention center, cruise ship, plane, stadium, library, school or the like.

Clearing house 205 can include an authentication, authorization, and accounting (AAA) server 206 and partner settlement server 209. In some embodiments of network access systems, only certain users are given network access. For example, the users may be required to be part of a specified group or may be required to pay for network access. Clearing house 205 provides services to allow a user to be authenticated and given access to the network. In an embodiment, the clearinghouse 205 is operated by a third party. In an embodiment, the clearing house 205 facilitates exchange of authentication and accounting messages between service providers and home entities. Home entities are entities which have a prior relationship with the user. In an embodiment, the clearing house 205 provides auditable data for settlement of roaming payments. In an embodiment, the clearing house utilizes RADIUS accounting. The AAA server 206 provides information and services necessary to track allowed users in order to grant the user access. For example, the AAA server may include a list of allowed users with corresponding identification information, such as, for example, a user name and password. The AAA server may also include information concerning whether or not a user has paid the required fees to access the network. The partner settlement server 209 tracks the user usage and charges.

Portals 201 can include the web pages where users are initially redirected to before authentication occurs. The portals can include local information and advertising and can provide the vehicle to allow a user to enter information for authentication and payment.

Figure 2C:
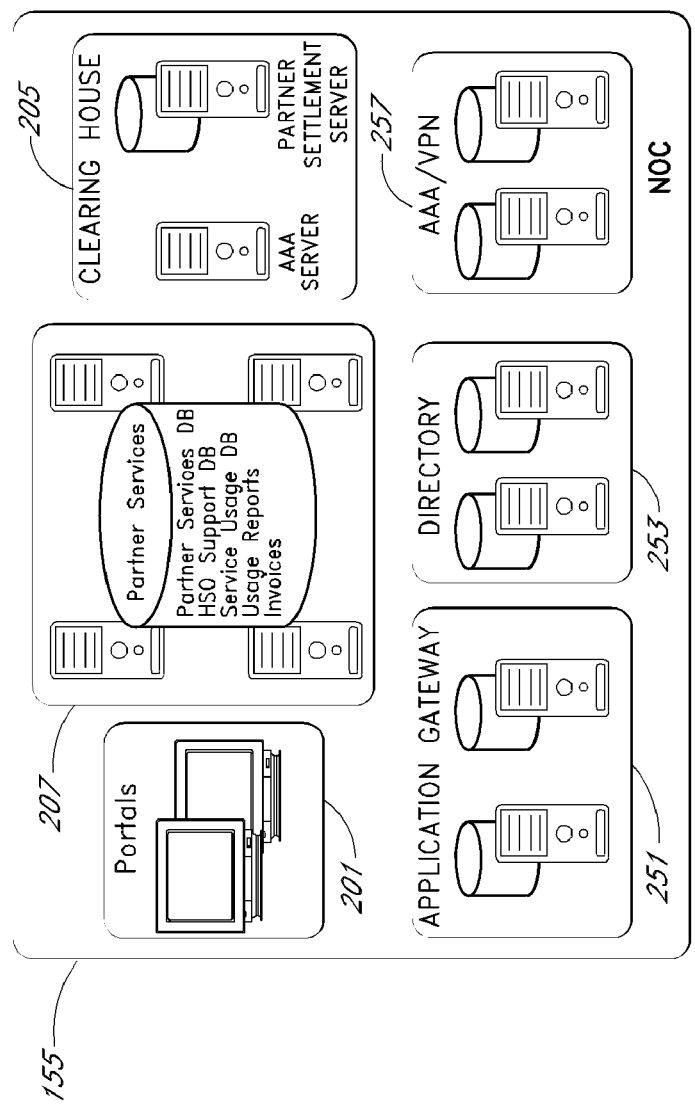

FIG. 2C illustrates another embodiment of a network operations center 155. The network operations center 155 includes portals 201, partner services 207, clearing house 205, application gateway 251, directory 253 and AAA/virtual private network (VPN) 257. Portals 201, partner services 207 and clearing house 205 are similar to those described with respect to FIG. 2B. Application gateway 251, directory 253 and AAA/VPN 257 can be used to provide similar functionality to that of access module 203 or more advanced functionality to provide security features as understood by those of skill in the art from the present disclosure.

Figure 3A:
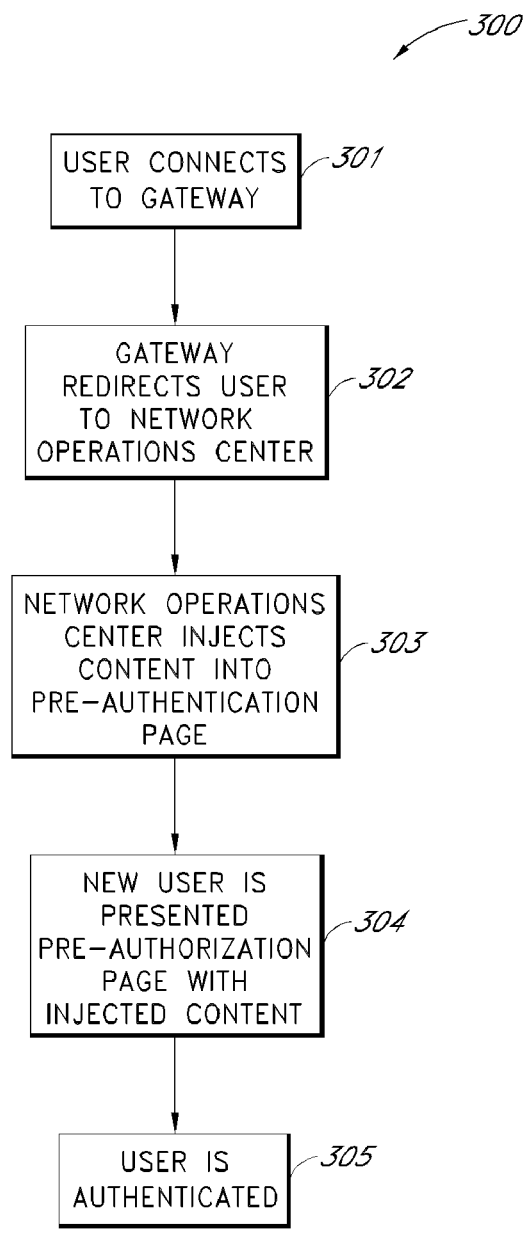
FIGS. 3A-3C illustrate flowcharts of embodiments of a content injection system.

FIG. 3A illustrates a flowchart of an authentication process 300. Authentication process 300 begins at block 301 where a user connects to the gateway using a client device. At block 302, the gateway device redirects the user to a network operations center. At block 303, the network operations center obtains a pre-authentication page and injects content into the pre-authentication page. At block 304, the new user is presented with the pre-authentication page containing the injected content. At block 305, the user inputs authenticating information and is authenticated to the network.

Figure 3B:
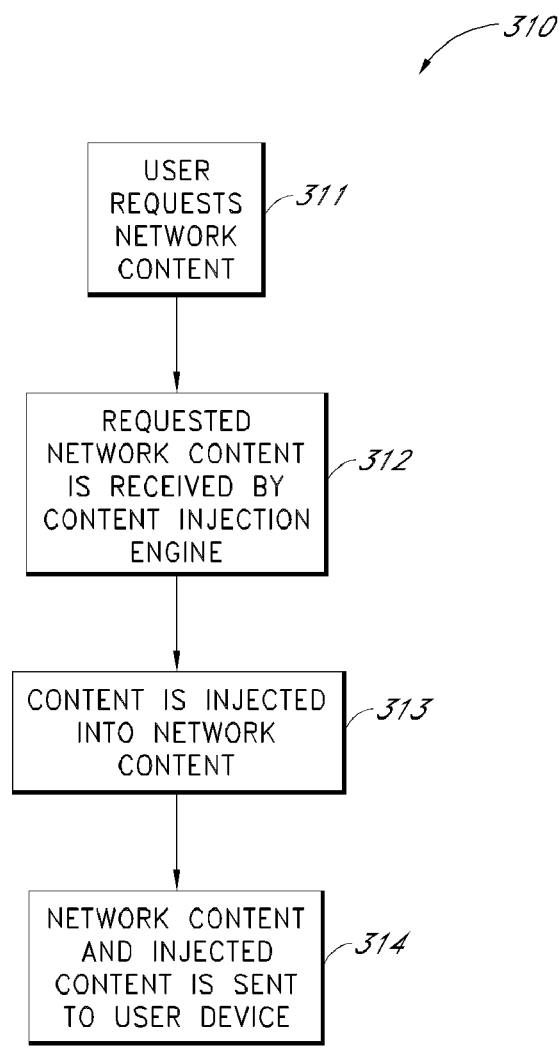

FIG. 3B illustrates a flowchart of an embodiment of a content injection process 310. The process begins at block 311 where a user requests network content using a client device in communication with a gateway device. The request is forwarded to the requested content server which replies with the requested content. The process 310 then moves to block 312 where the requested network content is received by the content injection engine. At block 313, the content injection engine injects content into the network content. The process 310 then moves to block 314 where the network content with the injected content is sent to the user's device.

Figure 3C:
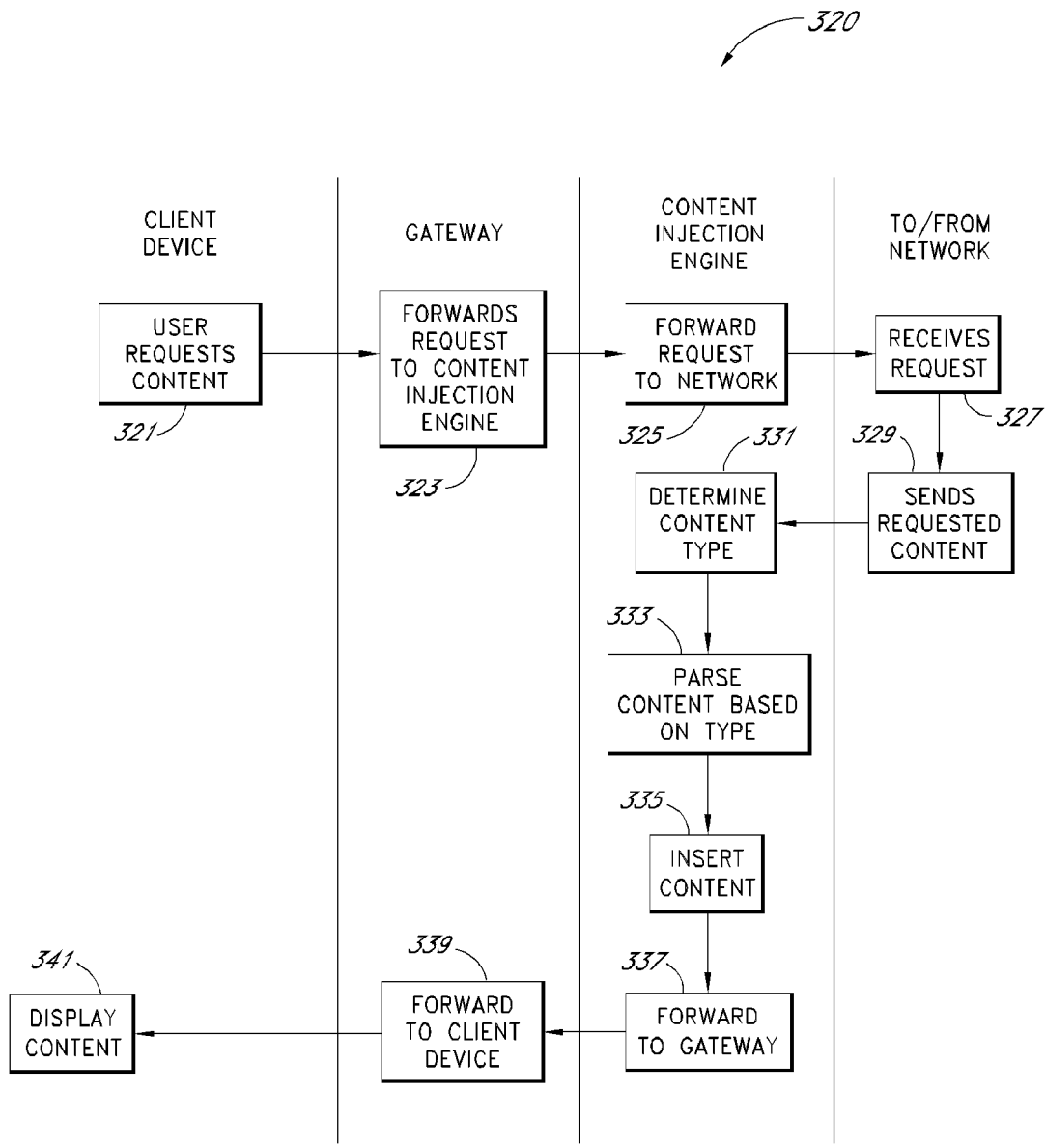

FIG. 3C illustrates a flowchart of another embodiment of a content injection process 320. At block 321 a user requests network content using a client device. The user's request is then forwarded from the client device to the gateway device. The gateway device forwards the user's request to the content injection engine at block 323. The content injection engine forwards the request to the network at block 325. The network receives the request at block 327 and forwards the request to the appropriate server which responds to the users request with content. The content is then sent from the network to the content injection engine at block 329. The content injection engine determines the content type at block 331. The content type can be, for example, HTML content, PDF content, audio-visual content, executable content, or any other type of content sent or received from a network system. Based on the content, the content injection engine injects content into the content received from the network. For example, if the content is HTML, the content injection engine parses the content at block 333, and injects new content at block 335. The altered content is then forwarded to the gateway device at block 337. The gateway device forwards the altered content to the client device at block 339. The altered content is displayed at block 341.

Figure 4A:
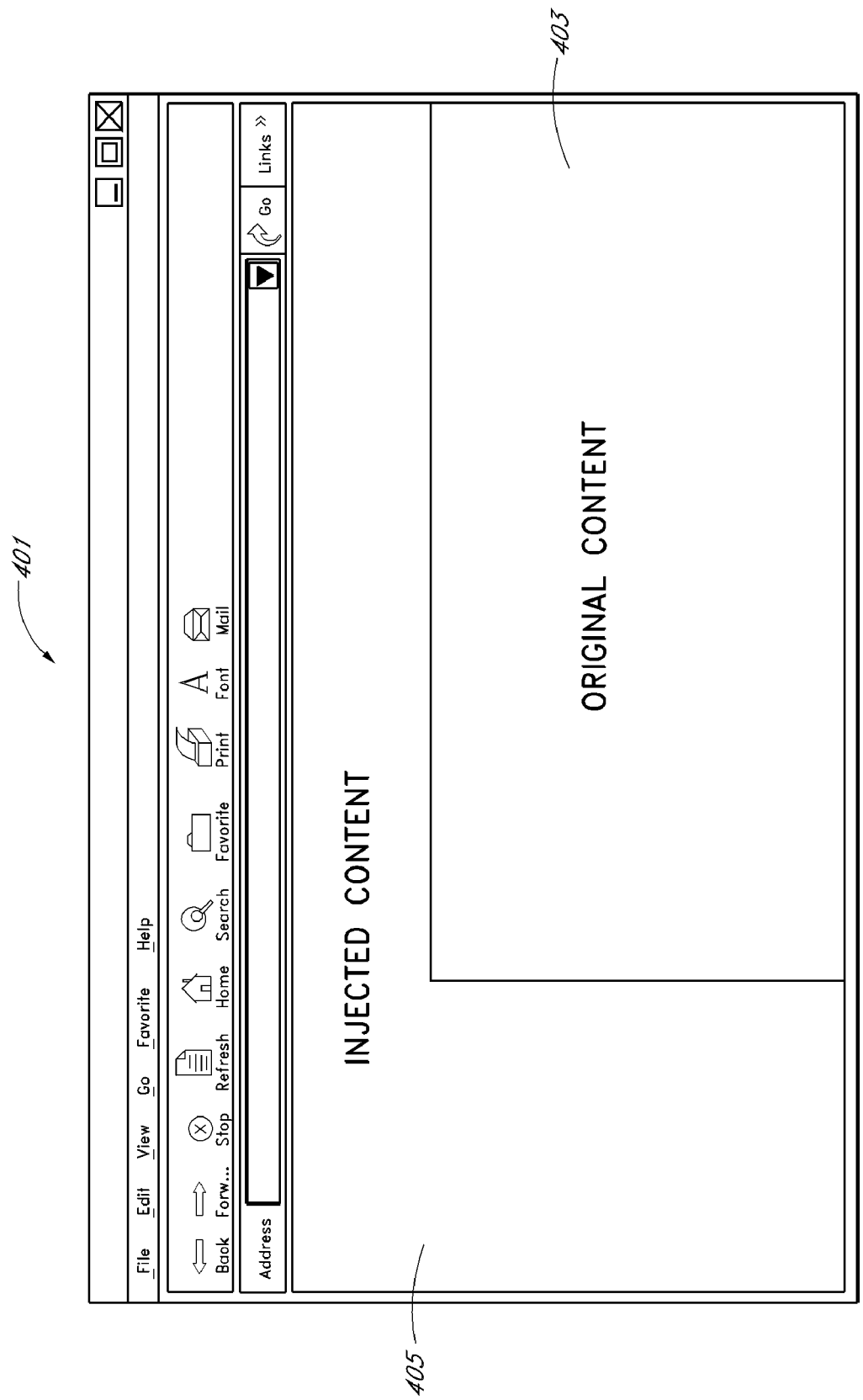
FIGS. 4A-4C illustrate screen shots of various embodiments of webpages with injected content.

FIG. 4A illustrates one example of a webpage with injected content. Webpage 401 includes original content 403 and injected content 405. Injected content 405 is included in a frame of the webpage 401. The frame may be of any shape, size, configuration or orientation. For example, the frame may be in the middle or on the right side of the webpage.

Figure 4B:
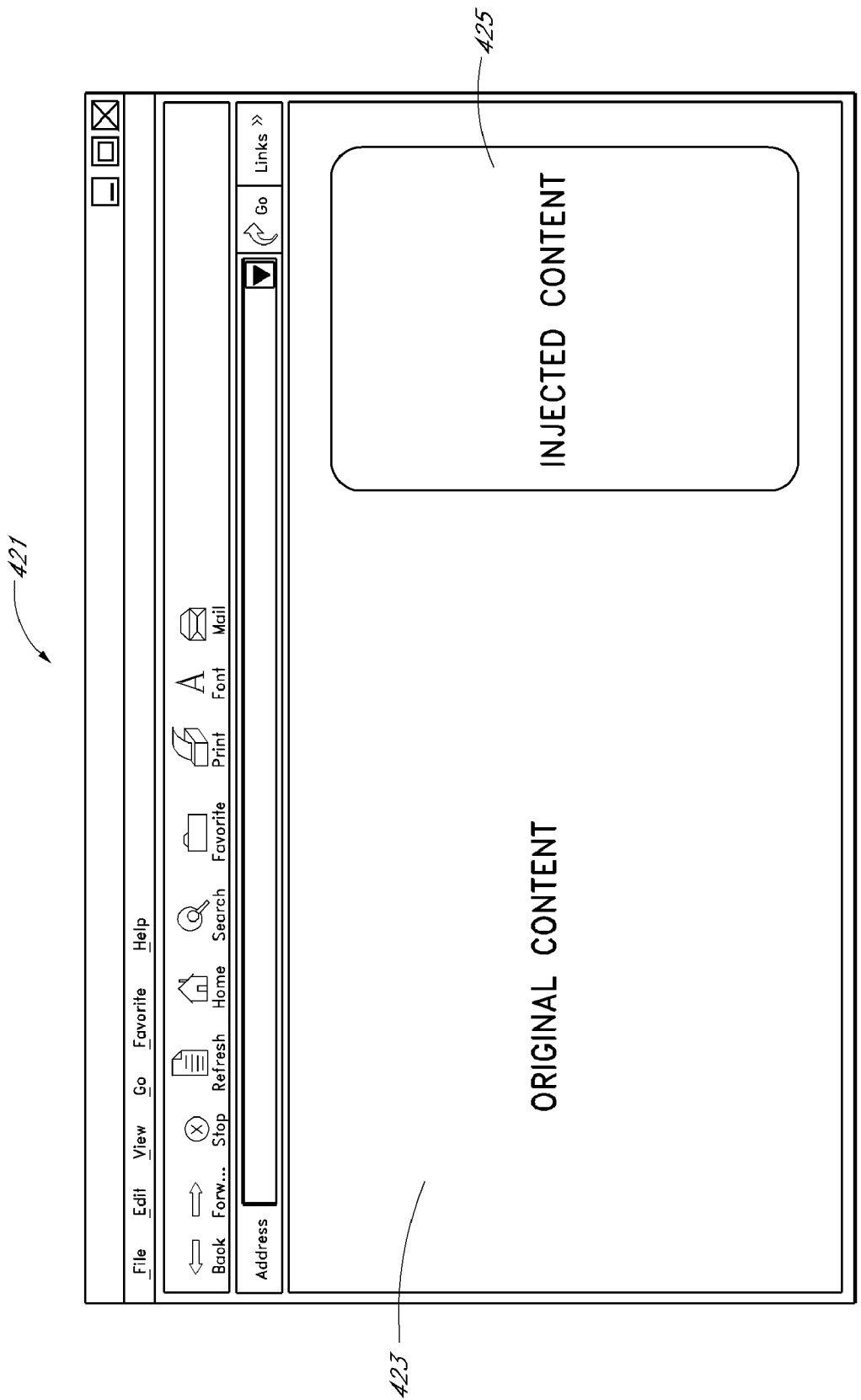

FIG. 4B illustrates injected content 425 in a frame or section of the webpage 421 of the original content 423. The frame or section of the webpage in which the injected content is placed can be a pre-existing frame or section, or a newly created frame or section, created by the content injection engine. The content injection engine 105 injects content independent of the content or the site from which the content is received. In an embodiment, content is injected in the form of an XML application. In an embodiment, content is injected in the form of an HTML application. In an embodiment, the content is injected in the form of a macromedia application.

Figure 4C:
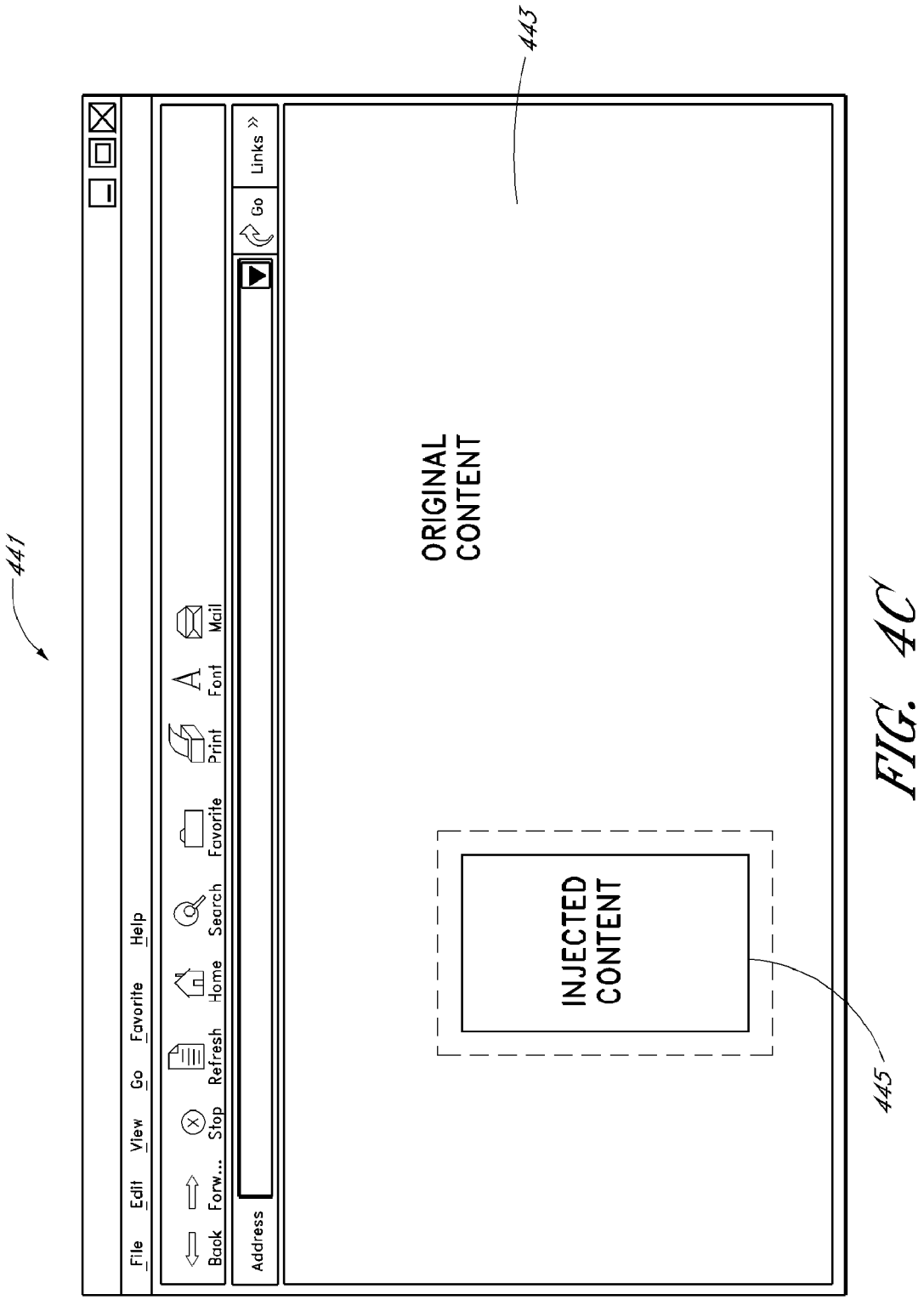

FIG. 4C illustrates an embodiment in which the content is injected into an XML or other application 445 of webpage 441 so as to be floating over original content 443. The XML application can be pre-existing to the frame or can be created by the injection engine.

The content to be injected can be delivered in any number of ways. For example, In an embodiment, the injected content is delivered in real time. In an embodiment, the content is stored on a remote or local server or on the portal server, gateway, or content injection engine. In an embodiment, content to be injected is stored and updated in real time or as needed.

The injected content can be chosen based on any of a variety of indications about the user. For example, the injected content may be based on the user's location, for example, as determined by the gateway device providing access. The content injected can also be determined based on metadata or other information contained in the requested content. The content injected can also be based on the past browsing history of the user or on preferences selected by the user. The content injected can also be based on the personal information obtained through the authentication processor from a venue provider. A person of skill in the art will understand from the present disclosure that many other indications about a user can be used to determine a type of content to inject into requested content.

In an embodiment, the content injected can be injected into any content type transferable over a network connection, such as, for example, HTML, PDF, Flash, streaming media, static media, or the like. In an embodiment, the content injected content can be of any type transferable over a network connection, such as, for example, HTML, PDF, Flash, streaming media, static media, or the like. In an embodiment, the injected content type is different than the content type into which the content is being injected. For example, streaming media can be injected into static content. In an embodiment, the content injection engine may communicate with other inline devices, such as, for example, the gateway, in order to increase the bandwidth allotted for a given user or user's channel so that the injected content does not affect the network performance of the user.

Figure 5A:
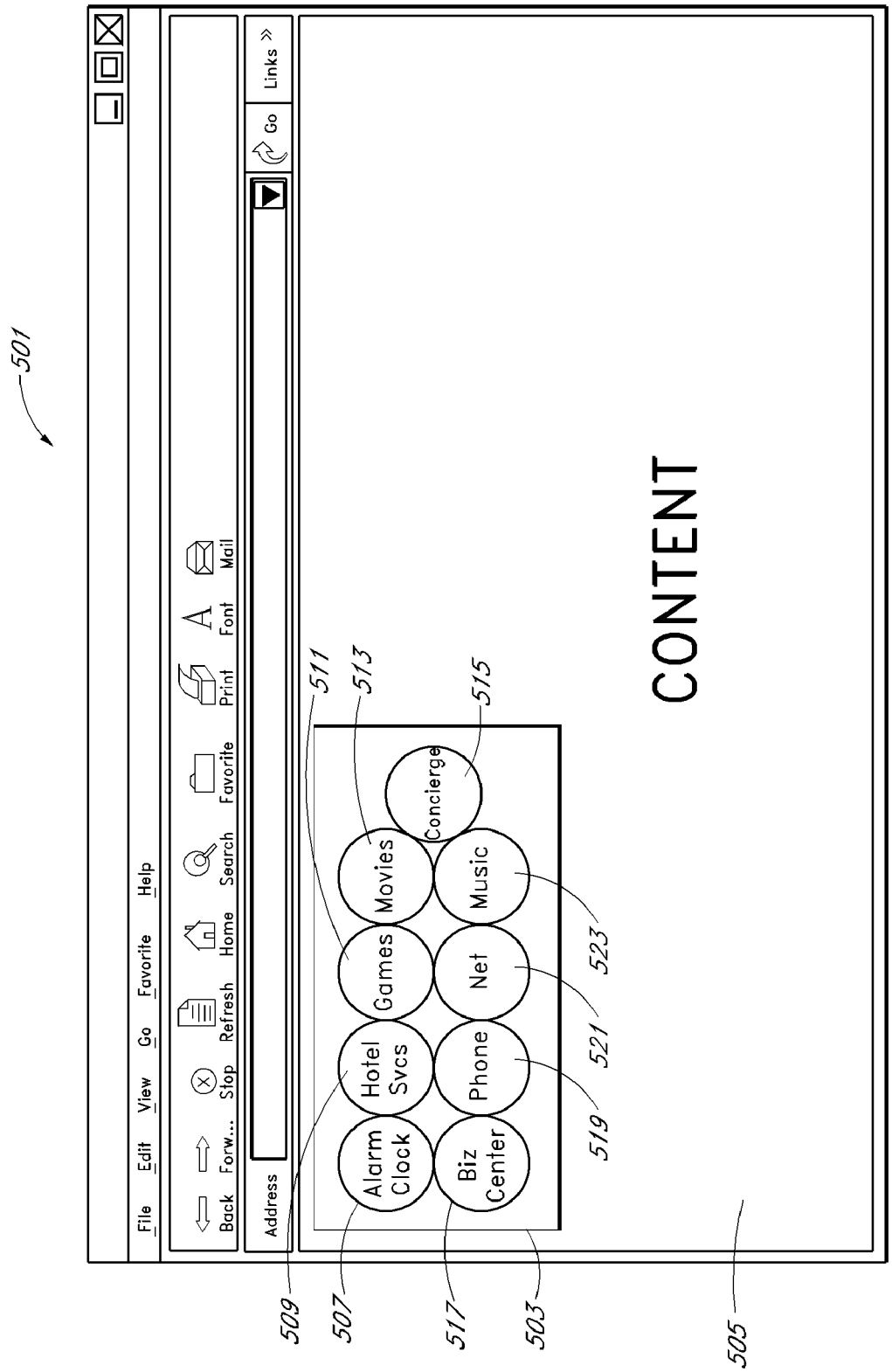
FIGS. 5A-6C illustrates various embodiments of virtual user kiosks.

FIG. 5A illustrates an embodiment of a User Kiosk or console system. The User Kiosk provides network and local information services for the user. The User Kiosk can be downloaded onto the user computer as an application or injected into requested content. In an embodiment, the User Kiosk provides a non-intrusive, pervasive console on the user's device in visitor-based networks without the necessity of installing client-side software. The console enables convenient access to valuable services. The console allows the user to access network-based applications as well as traditional services. The subscriber gains access to the capabilities provided by the console by simply connecting his/her network-enabled device to the local network (either wired or wireless) and opening a browser. In an embodiment, the User Kiosk provides one or more of the following functionality: weather information; wake up call; room service; faxing/printing; ordering a taxi; car rental; flight information; accessing local amenity information; local services; nearby restaurants; photo copy and business service locations; frequent flyer discounts; the ability to check out from the hotel, including payment; restaurant reservations, or the like. The User Kiosk may be designed in various ways to provide convenient information to the user. The User Kiosk can also provide interactive applications.

FIG. 5A illustrates one embodiment in which a User Kiosk 503 is provided in a browser window 501 with content 505. The User Kiosk 503 includes various management centers and interactive applications such as, for example, alarm clock 507, hotel services 509, games 511, movies 513, concierge 515, business center 517, phone 519, network center 521, and music 523.

Figure 5B:
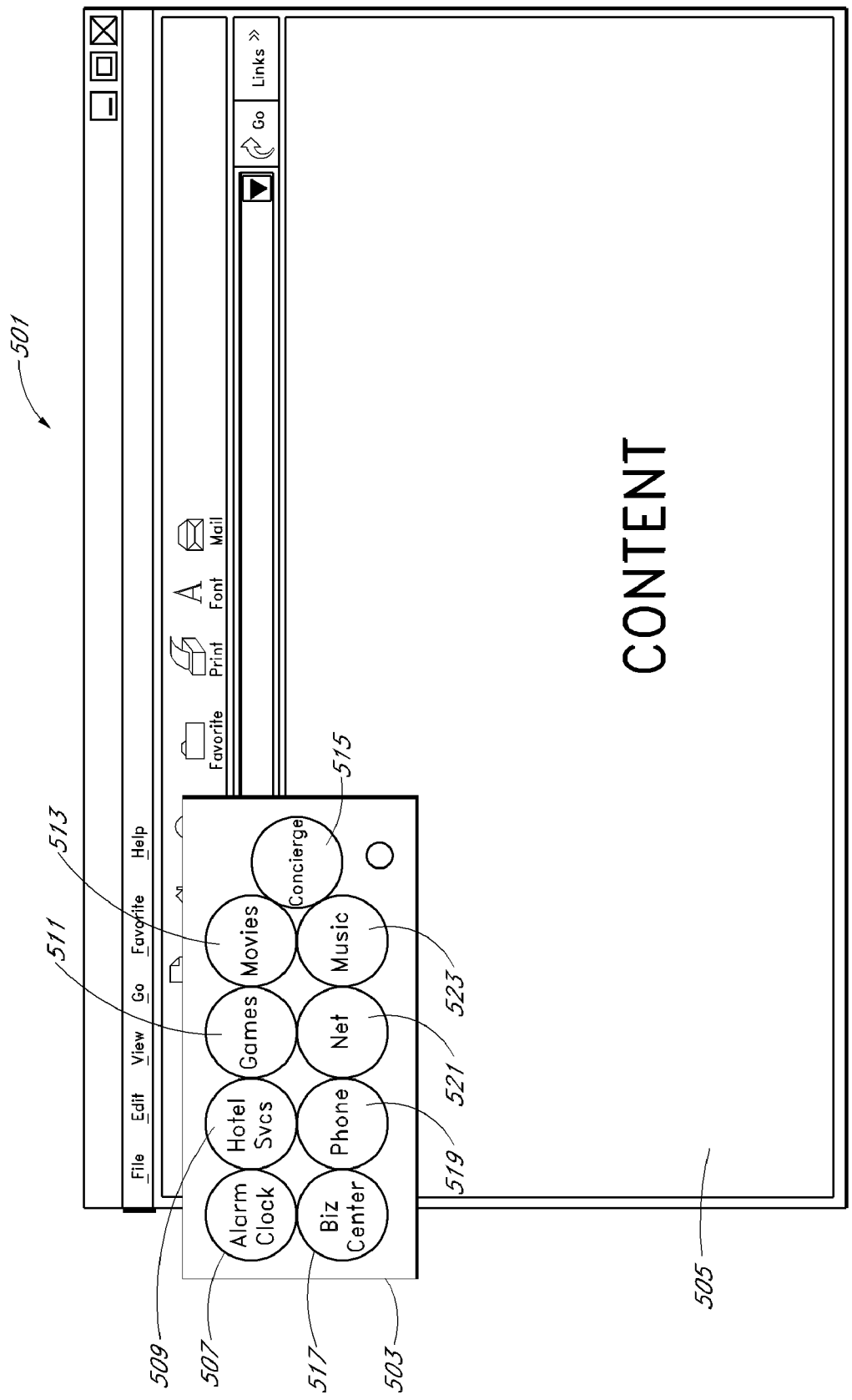
Figure 5C:
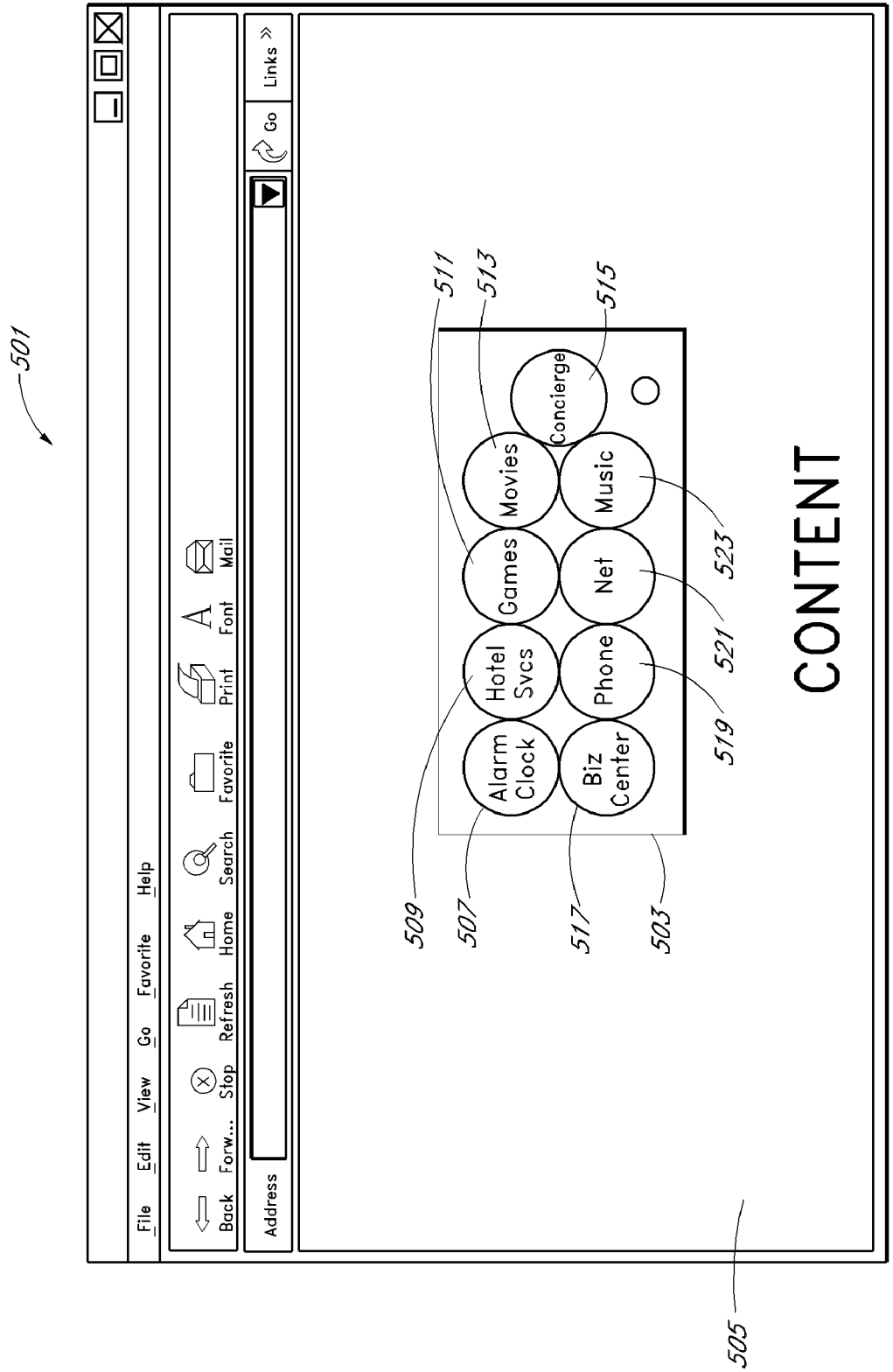

FIG. 5B illustrates an embodiment in which the User Kiosk 503 can be moved outside of the browser window. FIG. 5C illustrates an embodiment in which the User Kiosk 503 is moveable within the browser window.

Figure 6A:
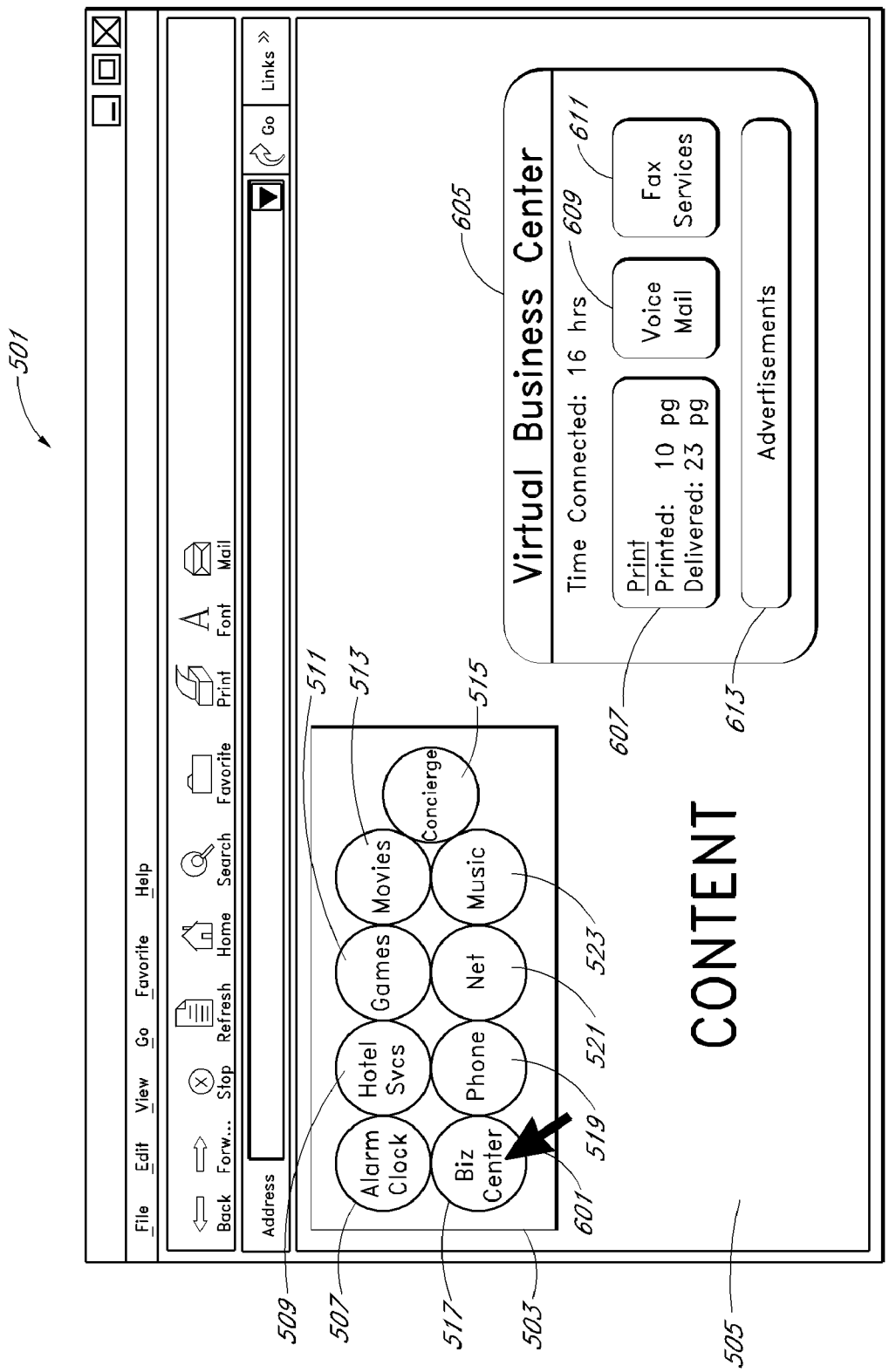

FIG. 6A illustrates an example of virtual business center 605. When a user clicks or mouses over business center 503, virtual business center 605 appears. The virtual business center 605 provides user information to the user relevant in conducting business and can include information specific to the user. For example, virtual business center 605 includes voice mail control function 609, fax services 611, and usage information 607. The virtual business center 605 can also include advertisements, such as, for example a banner advertisement including a moving advertisement, such as, for example, a ticker, or static banner advertisement.

Figure 6B:
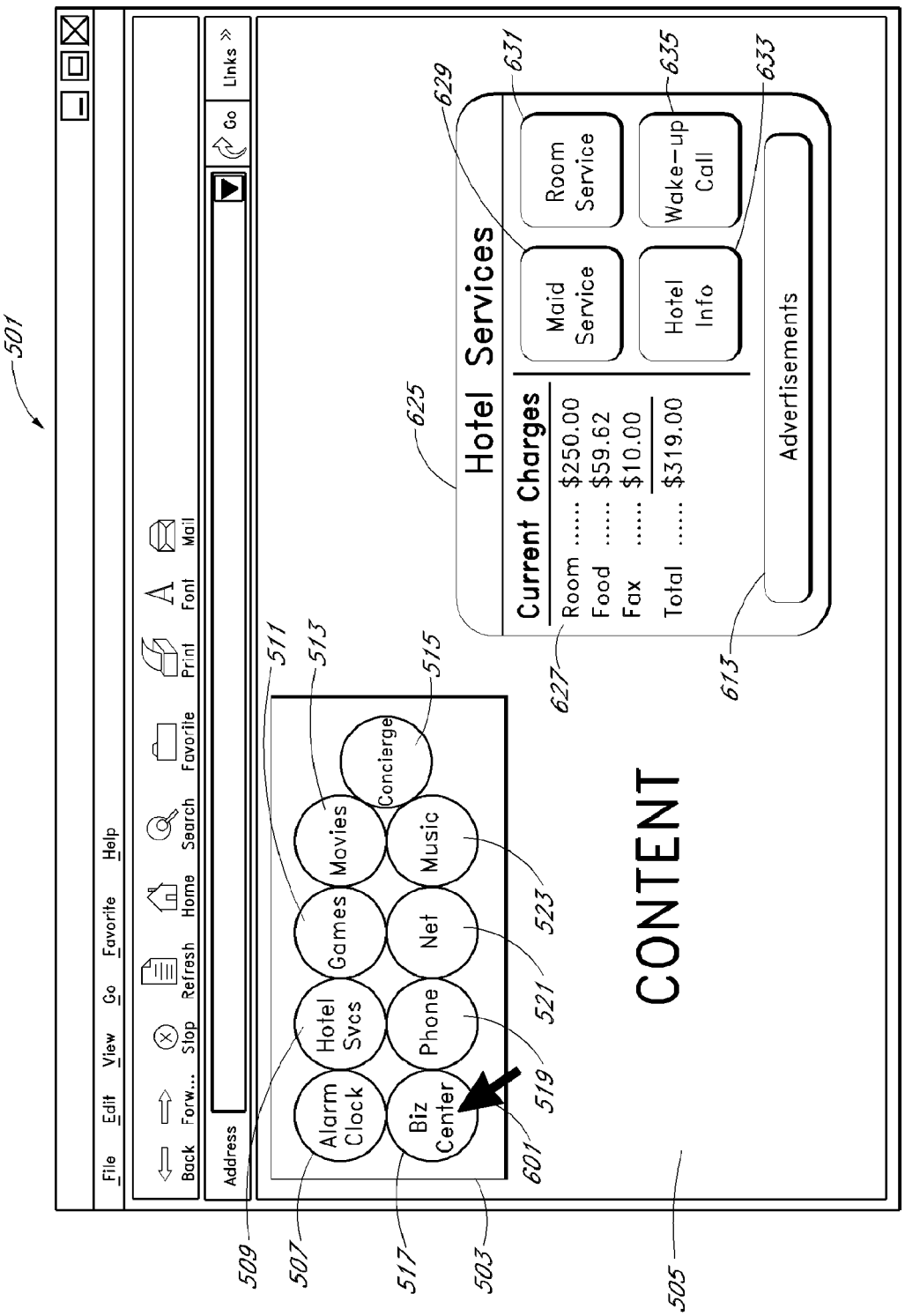

FIG. 6B illustrates an embodiment of hotel services center 625. Hotel services center 625 includes services related to a users hotel stay, such as, for example, current charges 627, made service 629, room service 631, hotel information 633, and wake-up call 635. The hotel services center 625 also can incorporate an advertisement 613.

Figure 6C:
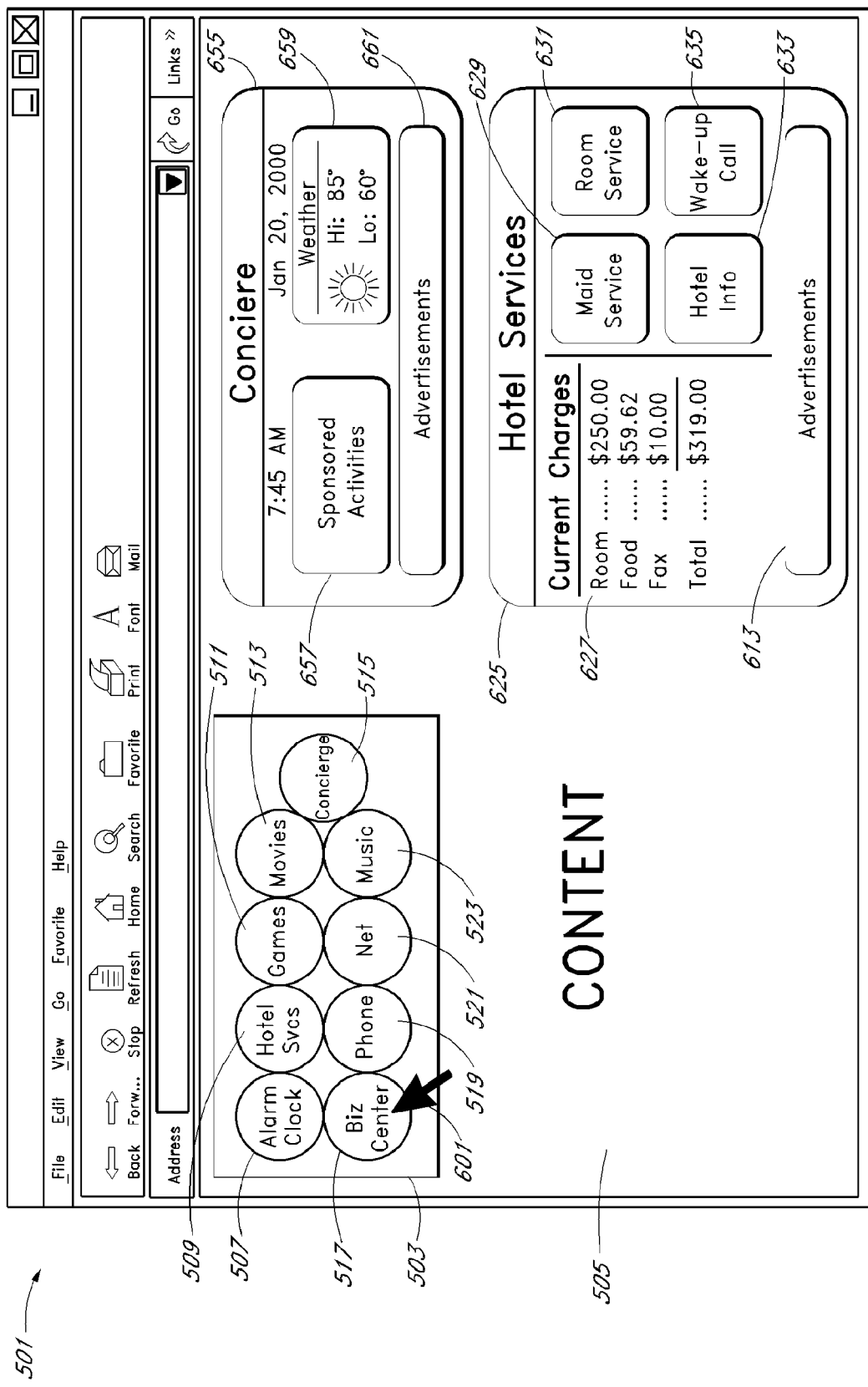

FIG. 6C illustrates an embodiment which includes both a hotel services center 625 and a concierge center 655. The concierge center 655 can include any type of information or applications useful to a hotel guest including sponsored activities notification 657, weather 659 and advertisements 661.

In an embodiment, the content injected is based on the content requested by the user, and not on information requested or fetched by the User Kiosk application.

In an embodiment, the User Kiosk is customizable. The User Kiosk can be customized by the user to include only specified content or expanded to include third party applications. In an embodiment, preferences related to the User Kiosk can be saved, for example, in the subscriber management server so that when a user moves to a new location, the User Kiosk includes the user's previously set preferences.

Although FIGS. 5A-6C are described in relation to a hotel stay, one of ordinary skill in the art will recognize from the disclosure herein that a similar virtual business center can be used in relation to other venues, such as, for example, a convention center, a library, a school, a business, a restaurant, shops, or any other network access venue.

Figure 7:
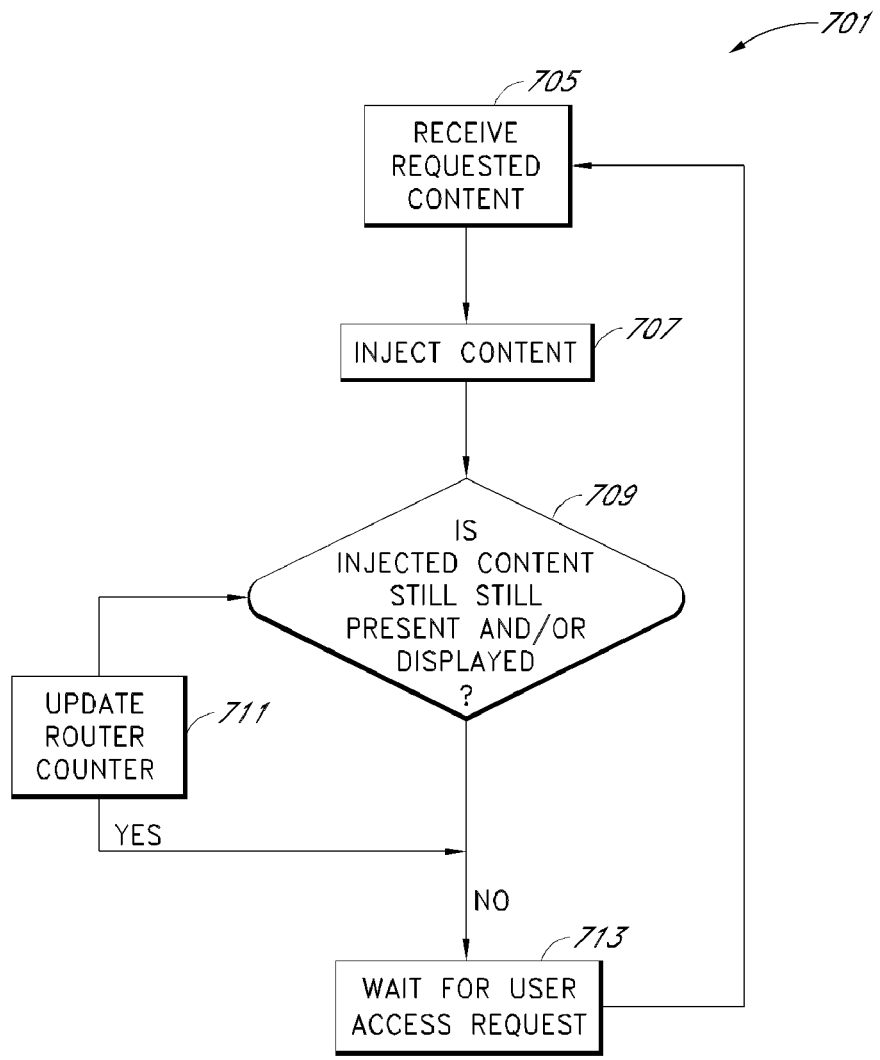
FIG. 7 illustrates a flowchart of an embodiment of a persistent content monitor.

FIG. 7 illustrates a flowchart of the operation of a heart beat or persistent content check process 701. When content is injected into requested content, it can be desirable to confirm that the content is still visible and/or included in the requested content. For example, if an advertisement is injected into the content, it may be desirable to confirm that the advertisement is still viewable and/or included in the requested content so as to gain the attention of the user. In an embodiment, a heart beat, or signal, is sent periodically from the injected content on the user's device to the content injection engine or other monitoring system. A heart beat monitor performs the function of checking to see if the content is still present and/or visible on the user's device. If the heart beat is not sent, or stops being sent, then the content injection engine assumes that the injected content is not present and/or displayed and initiates a process to re-inject the content.

In a browsing experience, this heart beat can be implemented as JavaScript code run in a frame. If the content's parent window is closed, this framed window will also close and the heartbeat will stop. This will trigger the content injection engine to re-inject the content at the next data request from the user. In an embodiment, the heartbeat mechanism is implemented using a macromedia flash applet downloaded for the window or as part of a User Kiosk application/applet that can be downloaded by the user.

The process 701 begins at block 705 where user requested content is received. Content is injected in the requested content at block 707. The process 701 continues by looking to see if the injected content is still present and or displayed on the user's device at block 709. If the answer is yes, then the ad rotator counter is updated at block 711. If the answer is no, then the system moves to block 713 where the process reinjects content or waits for a new user access request to reinject content.

Although the foregoing invention has been described in terms of certain preferred embodiments, other embodiments will be apparent to those of ordinary skill in the art from the disclosure herein. For example, although the disclosure has been described with respect to certain embodiments and certain programming languages, a person of ordinary skill will understand from the disclosure herein that other programming languages can be used to accomplish any aspect of the present disclosure. As another example, although the content injection engine is described with respect to injecting content, it is too be understood that injecting can mean both adding to the original content or replacing at least a portion of the original content. Additionally, other combinations, omissions, substitutions and modifications will be apparent to the skilled artisan in view of the disclosure herein. It is contemplated that various aspects and features of the invention described can be practiced separately, combined together, or substituted for one another, and that a variety of combination and subcombinations of the features and aspects can be made and still fall within the scope of the invention. Furthermore, the systems described above need not include all of the modules and functions described in the preferred embodiments. Accordingly, the present invention is not intended to be limited by the recitation of the preferred embodiments, but is to be defined by reference to the appended claims.

What is claimed is:

1. A method of tracking location specific usage of a client device in a network based system, the method comprising:
    receiving a first request from a client device for access to a network external to a local network of a first local network management system, said first local network management system located in a first area of a first venue;
    determining, that the client device is physically located in the first area of the first venue based at least in part on the first request for access to said external network at the first local network management system;
    tracking communications from the client device with said external network through the first local network management system;
    storing user preferences based at least in part on the tracked communications from the client device and said determination the client device is physically located in the first area;
    receiving a second request from the client device for access to a network external to a local network of a second local network management system, said second local network management system located in a second area of the first venue;
    determining that the client device is physically located in the second area of the first venue based at least in part on the second request for access to said external network; and
    providing location specific content to the client device based at least in part on said determination that the geographical location of the client device is in the second area of the first venue and the stored user preference based at least in part on the tracked client device communications.

2. The method of claim 1, further comprising providing an interactive tool configured to provide location specific services to the client device based on the determined geographical location of the client device.

3. The method of claim 2, wherein the interactive tool is further configured to provide hotel services.

4. The method of claim 3, wherein the interactive tool is further configured to provide location specific services to the client device based on the location specific usage tracking data.

5. The method of claim 3, wherein the interactive tool is further configured to provide location specific services to the client device based on data received from the local service providers.

6. The method of claim 5, wherein the location specific services comprises an advertisement based on the geographical location of the client device.

7. The method of claim 1, wherein the venue comprises one of the following: a coffee shop, an airport, a convention center, a cruise ship, a plane, a stadium, a library, or a school.

8. A network management system configured to track location specific usage of a client device in a network based system, the network management system comprising:
    a first local gateway device physically located at a first venue, said first local gateway device configured to receive a first request from a client device for access to an external network;
    a second local gateway device physically located at a second venue, said second venue at a geographically different location than said first venue, said second local gateway device configured to receive a second request from the client device for access to an external network; and a subscriber management system comprising a server, said server configured to:

determine that the client device is physically located at the first venue based at least in part on the first request for access to said external network;

track client device communications from the client device with said external network through the first local gateway device;

store user preferences based at least in part on tracked communications from the client device at the first local gateway device at the first venue;

determine a geographical location of the client device based at least in part on the second request for access to said external network; and provide location specific content based at least in part on the determined geographical location of the client device and the stored user preferences based at least in part on tracked client device communications.

9. The network management system of claim 8, wherein the one or more software modules are further configured to provide an interactive tool configured to provide location specific services to the client device based on the determined geographical location of the client device.

10. The network management system of claim 9, wherein the interactive tool is further configured to provide hotel services.

11. The network management system of claim 10, wherein the interactive tool is further configured to provide location specific services to the client device based on the location specific usage tracking data.

12. The network management system of claim 10, wherein the interactive tool is further configured to provide location specific services to the client device based on data received from the local service providers.

13. The network management system of claim 12, wherein the location specific services comprises an advertisement based on the geographical location of the client device.

14. The network management system of claim 10, wherein the location specific usage tracking data comprises data received by the interactive tool.

15. The network management system of claim 9, wherein the geographical location of the network gateway system comprises a geographical location of a venue.

16. The network management system of claim 15, wherein the venue comprises one of the following: a coffee shop, an airport, a convention center, a cruise ship, a plane, a stadium, a library, or a school.

* * * * *